United States Patent [19]
Bishop et al.

[11] Patent Number: 5,511,905
[45] Date of Patent: Apr. 30, 1996

[54] DIRECT INJECTION OF COLD FLUIDS INTO A SUBTERRANEAN CAVERN

[75] Inventors: William M. Bishop, Katy; Hugh D. Kaiser, Houston, both of Tex.

[73] Assignee: PB-KBB, INC., Houston, Tex.

[21] Appl. No.: 143,359

[22] Filed: Oct. 26, 1993

[51] Int. Cl.[6] ............................................. B65G 5/00
[52] U.S. Cl. .......................... 405/59; 405/53; 166/57
[58] Field of Search ............................. 166/57, 302, 303; 405/53, 55, 56, 59

[56] References Cited

U.S. PATENT DOCUMENTS

| | | | |
|---|---|---|---|
| 2,869,328 | 1/1959 | Gibson et al. | |
| 2,942,424 | 6/1960 | Koble. | |
| 3,056,265 | 10/1962 | Swinney | 405/59 |
| 3,068,884 | 12/1962 | Naul et al. | 405/59 X |
| 3,232,725 | 2/1966 | Secord et al. | 48/190 |
| 3,289,416 | 12/1966 | Varvel | 166/252 |
| 3,309,883 | 3/1967 | Waterman | 405/56 X |
| 3,477,509 | 11/1969 | Arendt. | |
| 3,504,506 | 4/1970 | Scisson | 62/46.1 |
| 3,745,770 | 7/1973 | Fraser et al. | |
| 3,807,181 | 4/1974 | Kuhne | 405/59 |
| 3,848,427 | 11/1974 | Loofbourow | 62/260 |
| 3,950,958 | 4/1976 | Loofbourow | 405/56 X |
| 4,365,978 | 12/1982 | Scott | 405/59 X |
| 4,417,829 | 11/1983 | Berezoutzky | 405/59 X |
| 4,626,131 | 12/1986 | Glew et al. | 405/59 |
| 4,671,700 | 6/1987 | Boulanger et al. | 405/55 X |
| 4,732,508 | 3/1988 | Berezoutzky | 405/59 X |
| 5,129,759 | 7/1992 | Bishop | 405/59 |

FOREIGN PATENT DOCUMENTS

| | | | |
|---|---|---|---|
| 1713856 | 2/1992 | U.S.S.R. | 405/53 |

OTHER PUBLICATIONS

Fifth International Conference on Liquified Natural Gas 1977 *Studies on the Storage of LNG in Salt Cavities;* Session II, Paper 8, (12 p.).

*Primary Examiner*—John A. Ricci
*Attorney, Agent, or Firm*—David A. Rose

[57] ABSTRACT

The subterranean storage facility includes a subterranean cavern forming an underground cavity in which is disposed an immiscible displacing liquid. A plurality of concentric pipes extend from the surface into the cavity. As a cold fluid at a sub-zero temperature is passed down a first flow bore formed by the concentric pipes, the immiscible displacing fluid is passed in heat exchange relationship up a second flow bore formed by the concentric pipes. The cold fluids are then stored within the cavity at a temperature and pressure consistent for safe storage.

25 Claims, 4 Drawing Sheets

DIRECT INJECTION OF COLD FLUIDS INTO A SUBTERRANEAN CAVERN

FIELD OF THE INVENTION

This invention relates to the storage of cold fluids and more particularly to the storage of cold fluids in a subterranean cavern as a part of a storage facility and still more particularly to the direct injection of cold fluids into a subterranean cavern during the off-loading of the cold fluids from a tanker.

BACKGROUND OF THE INVENTION

Cold fluids, such as liquid natural gas (LNG), liquid petroleum gas (LPG), hydrogen, and helium, are maintained at sub-zero temperatures to transport and store such cold fluids as liquids rather than as gases. Liquids require less storage space than gases due to their reduced volume. Cold fluids are typically stored in tanks made with cryogenically compatible materials. Such materials are very expensive thereby substantially increasing the cost of building and maintaining tanks for the storage of cold fluids in the liquid state at sub-zero temperatures. Often the cold fluids are subsequently heated to change the cold fluids from a liquid state to a gaseous state for purposes of use or for transporting through a pipeline.

In one typical situation, natural gas and petroleum gas are transported from port to port as cold fluids by ocean-going carriers or tankers in cryogenic tanks or holds on board the vessel. To maintain natural gas in liquified form at or near atmospheric pressure, the temperature of the natural gas is kept at −270° F. Petroleum gas may also be transported by tanker as liquified petroleum gas by maintaining the temperature of the petroleum gas at −45° F. Upon reaching port, the tanker docks at the pier of an on-shore terminal or facility and connects to articulated piping allowing the transfer of the liquified natural gas or liquified petroleum gas to cryogenic tanks for storing the cold fluids in liquid form. The liquified natural gas or liquified petroleum gas is pumped through the articulated piping to the cryogenic tanks at a pressure sufficient for overcoming pressure losses through the surface piping and for filling the tanks at a pressure slightly greater than atmospheric. The pumps are designed to handle cryogenics and may be low pressure pumps since the off-loading discharge pump pressure is low. The LNG or LPG is subsequently heated to near ambient temperature so that the LNG can be transported on shore by pipeline in gaseous form to another location or in the case of LPG in liquid form. It is preferred that the facility or terminal have the ability to receive at the maximum flow rate of the tanker.

The cryogenic tanks on shore for storing LNG are built at tremendous capital cost. The LNG must be kept refrigerated in these cryogenic tanks at these very low temperatures while stored in the tanks. When the LNG is to be transported by pipeline, it must be heated to vaporize it for transporting through the pipeline. Thus, the facility or terminal must have the capability to heat the LNG. The cost of heating liquified natural gas is approximately $.50 to $.75 per thousand cubic feet of gas. Not only are cryogenic facilities expensive, but the cost of vaporization is also expensive.

The storage of hydrocarbons in naturally occurring conventionally mined, or solution-mined subterranean cavities is well known. Generally, the subterranean cavity is filled entirely with hydrocarbons and an immiscible displacing liquid, such as saturated brine. The hydrocarbons and brine are housed within the cavity in separate phases. When it is desired to introduce additional hydrocarbons into the cavity, a corresponding volume of brine is simultaneously withdrawn. Conversely, when it is desired to withdraw hydrocarbons from the cavity, it is displaced therefrom with a corresponding volume of brine introduced simultaneously into the cavity. Such on-shore storage systems and methods are generally accepted.

Salt storage caverns have most often been used as the subterranean cavity to store hydrocarbons. A cavern is formed in a salt dome or strata by leaching. It is commonplace to drill into the soluble salt formation, suspend a wash pipe and concentric pipe strings into the cavity, and produce brine by solution mining, well known in the art. Dual fluid passages are provided into the cavern in the concentric pipe strings so that fluid handling means at the surface provide a capability for brine to be pumped into and out of the lower area of the cavern and the hydrocarbons can be taken from the upper area. Hydrocarbons are added to storage by pumping the hydrocarbons into the cavern under sufficient pressure to displace the brine therein back to the surface. The displaced brine is maintained at ground level in a brine pit or reservoir, and then is returned to the salt cavern to replenish the volume of brine as hydrocarbons are retrieved. Precautions are taken to assure that the brine in and out of the cavern is always salt-saturated to avoid enlarging the brine cavern. In a typical downhole salt cavern, the hydrocarbons stored in the cavern are removed from the cavern by pumping the hydrocarbons to the surface through the annulus formed by the concentric pipe strings.

It is known to store natural gas in a subterranean salt cavern in the gaseous state. The natural gas is compressed into the subterranean cavern under pressure and at a temperature only slightly different from the temperature of the brine disposed within the cavern. Since there is very little temperature differential between the natural gas and brine, there is only minor counterflow heat exchange between the natural gas and brine as the brine is displaced from the cavern. The temperature of the natural gas is substantially steady-state. It is desirable that the temperature of the natural gas not be substantially reduced since it is desirable that the temperature of the gas not be too low upon removal from the cavern. The natural gas may be under sufficient pressure that upon opening a valve, the natural gas flows out of the cavern under its own expansion.

Natural gas is not stored in a subterranean cavern as a liquid since it must be stored at sub-zero temperatures to maintain the natural gas in liquid form. Storage of the natural gas at such extremely low temperatures would adversely affect the structural integrity of the cavern walls and may cause the cavern walls to fracture. Also, off-loading the liquified natural gas at sub-zero temperatures requires special equipment. Further, if the temperature of the natural gas in the cavern is too low, the brine in the cavern would freeze, thereby plugging up the flow paths through the concentric pipe strings extending into the cavern.

It is known to store liquified petroleum gas in salt caverns in a liquid state. The LPG is maintained at a temperature between 80° and 90° F. and under sufficient pressure within the cavern to keep the LPG in liquid form. Although the LPG is typically shipped at temperatures of −45° F., the LPG is heated before it is stored in the subterranean cavern. Since it is desirable to unload the LPG from the tankers at a very high off-load rate, it is expensive to preheat the LPG at that same very high rate. Further, the LPG is at such a low temperature upon offloading from the tanker that these low temperatures require specialized equipment.

U.S. Pat. No. 2,869,328 discloses introducing hydrocarbons into an underground storage cavity with the brine in the cavity being displaced up through a pipe string. As the brine flows up through the pipe string in countercurrent heat exchange relationship with the incoming cool hydrocarbon, the temperature and pressure of the brine are gradually reduced as the brine approaches the surface causing the precipitation of salt. To prevent the build-up of salt within the pipe string so as not to clog the pipe string, a supply conduit is passed down the pipe string for injecting fresh diluting water into the lower end of the pipe string to dilute the brine and prevent precipitation of the salt within the pipe string. If an unusual deposit of salt were to occur within the pipe string, the supply conduit may be used to flush the pipe string with fresh water and remove the salt deposit.

SUMMARY OF THE INVENTION

The method and apparatus of the present invention includes a facility having a plurality of subterranean caverns located either on-shore or off-shore for housing cold fluids such as LNG or LPG. Concentric tubing and casing are suspended from a wellhead at the surface into the subterranean cavern. The cold fluids are pumped down one of the flow bores formed by the concentric tubing and casing and into the cavern. The cavern includes brine which is displaced up another flow bore formed by the concentric tubing and casing as the cold fluids pass down into the cavern. As the cold fluids pass down the one flow bore and the brine passes up the other flow bore, counterflow heat exchange occurs whereby the cold fluids are heated to a temperature consistent with safe storage in the cavern, and the brine is cooled. In the case of LNG, the warmer temperature and higher pressure of the LNG in the cavern results in the LNG being maintained in the dense phase, i.e. neither liquid or gas. In the case of LPG, the LPG remains as a liquid at cavern temperature and pressure. To remove the cold fluids from the cavern, brine is pumped down the inner tubing forcing the cold fluids back up the annulus to the surface where the cold fluids pass to a pipeline at approximately ambient temperature.

A buffer annulus may be disposed around the outer casing string to ensure that the cold fluids passing down the one flow bore do not adversely affect the last cemented casing string extending to the top of the cavern. A warm fluid of the same composition as the cold fluid is passed down the buffer annulus to maintain the last cemented casing string at predetermined temperatures.

A dilution line may also be run down the inner tubing string to inject water into the tubing string at one or more locations to ensure that the salt in the brine passing up the inner tubing string does not crystalize and reduce flow or heat transfer.

The present invention provides several advantages over the prior art. Storing gas in any phase in a subterranean cavern is safer than storing liquified gas as a liquid in a cryogenic tank above ground. There is greater safety in down-hole storage since any equipment on the surface has greater exposure to natural disaster and human error. Further, the present invention has a cost of approximately ⅙ of the capital cost of conventional cryogenic storage facilities. Also, the cost of vaporization is substantially reduced in using the present invention.

Other objects and advantages of the present invention will appear from the following description.

DESCRIPTION OF THE DRAWINGS

For a detailed description of a preferred embodiment of the invention, reference will now be made to the accompanying drawings wherein.

DESCRIPTION OF THE PREFERRED EMBODIMENT

The term "cold fluids" shall be the generic name of any fluid to be directly injected into a subterranean cavern and the word "cold" shall only be indicative of the temperature of the cold fluid prior to injection into a subterranean cavern and not after the cold fluid has undergone heat exchange and/or reached the ambient temperature within the subterranean cavern. Further, the term "liquified natural gas" or "liquified petroleum gas" shall likewise be the generic name of the natural gas or petroleum gas to be directly injected into the subterranean cavern and the word "liquified" shall only be descriptive of the natural gas and petroleum gas prior to direct injection into the subterranean cavern. The natural gas and petroleum gas may or may not be in the liquified form after heat exchange or upon reaching ambient temperature within the cavern. This is particularly the case of liquified natural gas which, in the preferred embodiment, is stored in the dense phase.

Figure 1:
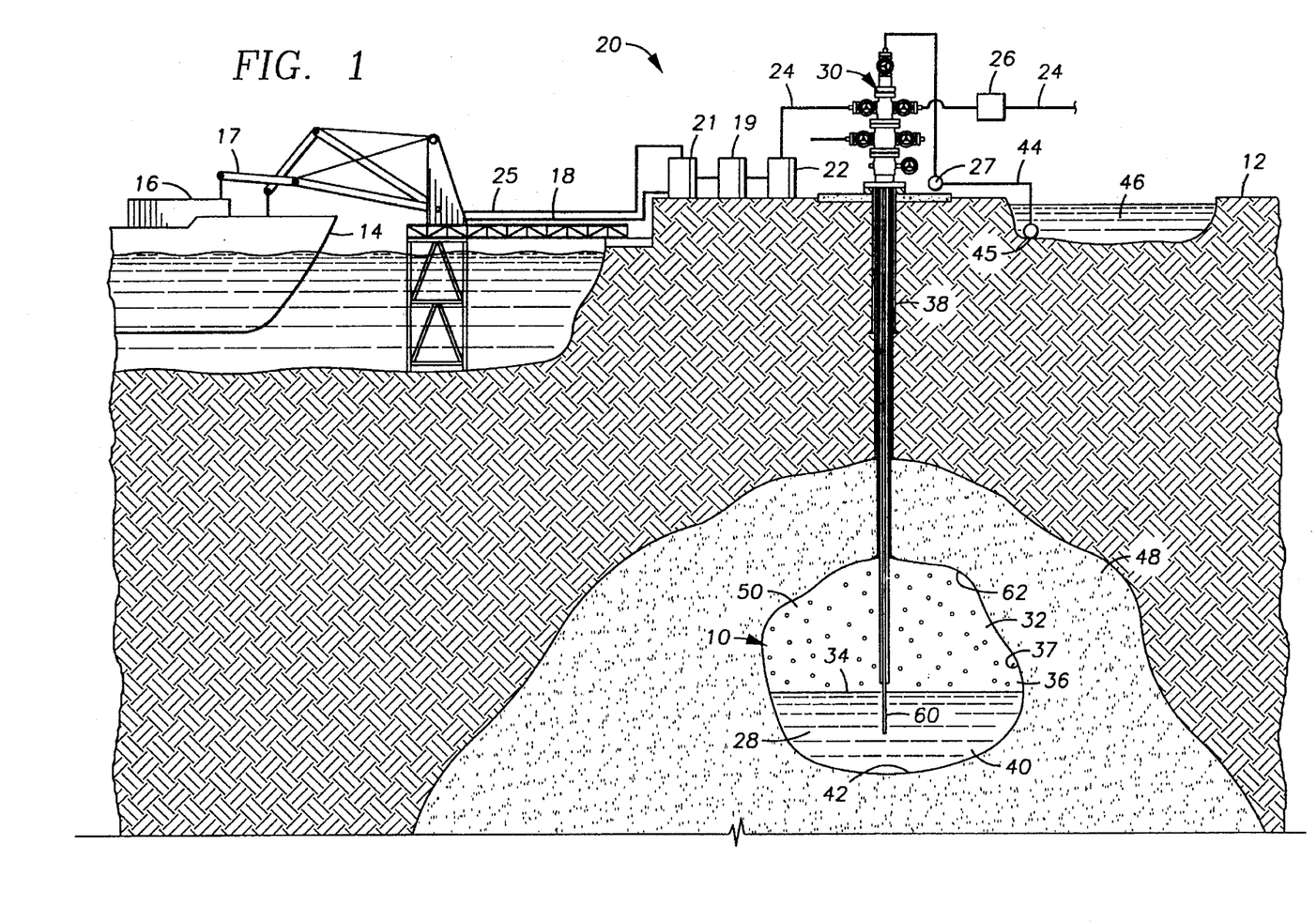
FIG. 1 is a schematic sectional view of the storage facility using the present invention.

Referring initially to FIG. 1, the present invention includes one or more injection wells or underground caverns such as cavern 10 located beneath the ground 12 to create a storage facility for fluids normally maintained at sub-zero temperatures during transportation. The number of caverns in each storage facility must be sufficient to accommodate the off-load flow rate of a tanker. Typically, a tanker transporting liquified gas unloads one billion cubic feet of gas per day. To accommodate this rate of unloading, approximately six injection wells would be required. The number of injection wells may be increased or decreased as desired. The underground caverns may be located on-shore or off-shore. An off-shore facility is described in U.S. Pat. No. 5,129,759 entitled "Offshore Storage Facility and Terminal".

FIG. 1 illustrates an on-shore facility with a tanker 14, such as a supertanker, transporting a cold fluid, such as liquified natural gas, liquified petroleum gas, hydrogen, or helium, as for example, from one port to another. The port includes a terminal facility 20 located on-shore for unloading the cold fluid 50 from tanker 14. The tanker 14 docks at a pier and is connected to articulated piping 17 connected to a flow line 18 extending to the terminal facility 20 allowing the transfer of the cold fluids 50 from tanker 14 to facility 20. The cold fluids are pumped from tanker 14 at a pressure sufficient to overcome pressure losses through the surface piping and to displace an immiscible displacing fluid 40 from cavern 10. A high pumping pressure is required and multi-stage high pressure pumps 19 are located on-shore at facility 20 to boost the pressure of the cold fluids 50 to the required injection pressure into cavern 10. The multi-stage high pressure pumps 19 include sealing systems which are effective at sub-zero temperatures.

The cold fluids 50 may then be piped through a preheater 22 to raise the temperature of the cold fluids 50 prior to flow communication with a wellhead 30 suspending concentric pipe strings 38 into cavern 10. The heating of the cold fluids 50 is desirable during initial start-up when cavern 10 and wellbore 38 are completely filled with the immiscible displacing liquid 40. Contacting the cold fluids with the immiscible displacing liquid 40 will result in the immiscible displacing liquid 40 freezing. Heating the cold fluids 50 will prevent the freezing of the immiscible displacing liquid 40. Therefore, a preheater 22 may be used to warm the incoming cold fluids 50 until the immiscible displacing liquid 40 in the concentric pipe string 38 is displaced to a point below the cavern roof 62. Conversely, a long flow distance between tanker 14 and cavern 10 may achieve the same preheating. Preheaters 22 may also be used from time to time for partial warming of the cold fluids 50 prior to injection into cavern 10. Multi-stage high pressure pumps 19 and preheater 22 are sized to accommodate the maximum flow rate of the cold fluids 50 in off-loading tanker 14.

A pipeline 24 is connected to the wellhead 30 for transporting the cold fluid 50, stored in one of the plurality of caverns such as cavern 10, to another location. The cold fluid 50 from cavern 10 may also pass through a heater 26 to adjust the temperature of the cold fluid 50 prior to passing into pipeline 24. It should be understood, of course, that pipeline 24 may be of any size depending upon the average expected flow rate from cavern 10 for transporting the cold fluids 50 through pipeline 24.

The design of the subterranean caverns such as cavern 10 is similar to that of the design used for strategic petroleum reserves. Cavern 10 may have a volume of approximately 10 million barrels with a net capacity for cold fluid of approximately 9 million barrels. A typical cavern 10 may be disposed 2500 feet below the ground 12, have an approximate height of 2,000 feet, and a diameter of approximately 200 feet. The size of the cavern 10 will vary.

The immiscible displacing liquid 40 is disposed in underground cavern 10 with a cold fluid 50. The immiscible displacing liquid 40 will not mix with the cold fluid 50. Since the immiscible displacing liquid 40 has a greater density than that of the cold fluid 50, the denser immiscible displacing liquid 40 will settle to the bottom or lower area 28 of underground cavern 10 and separate in a separate phase from the cold fluid 50 which will accumulate at the top or upper area 32 of underground cavern 10. This separation into separate phases creates an interface 34 between the two fluids within underground cavern 10. The cold fluid 50 and immiscible displacing liquid 40 completely fill the volume or cavity 36 of underground cavern 10 whereby as either the cold fluid 50 or immiscible displacing liquid 40 are removed from underground cavern 10, the other fluid is flowed into underground cavern 10 to fill the volume which has been vacated.

The wellhead 30 supports a plurality of concentric casing and tubing 38 from above the ground 12 to the cavern 10. The innermost tubing string 60 extends from the wellhead 30 through the concentric casing 38 to a point adjacent the bottom 42 of cavern 10. A booster pump 27 may be provided at the ground level at wellhead 30 to assist the flow of the immiscible displacing liquid 40 to and from cavern 10. A displacing liquid pipeline 44 extends from wellhead 30 to a displacing liquid pond or reservoir 46. A submersible transfer pump 45 may be provided in reservoir 46 or within a vertical portion of the pipeline 44 for pumping the immiscible displacing liquid 40 from reservoir 46 through pipeline 44 and into tubing string 60 to the lower area 28 of underground cavern 10.

The preferred immiscible displacing liquid 40 for liquified natural gas and liquified petroleum gas is brine. Brine is immiscible with hydrocarbons and is denser than hydrocarbons. For example where cold fluid 50 is LPG, the density of LPG is approximately 0.55 and the density of brine is approximately 1.2, where water is approximately 1.0. This immiscibility and difference in density causes the brine 40 to separate from the LPG 50 and settle into the lower area 28 of underground cavern 10. The LPG 50 moves to the upper area 32 of underground cavern 10 and form an interface 34 with the brine 40. Natural depressions or existing brine ponds may be used as a reservoir 46 for brine 40.

It is preferred that the underground cavern 10 be a salt cavern. Salt caverns are formed by "leaching" an underground salt dome, such as salt dome 48, whereby water is pumped down into salt dome 48 through a wash pipe (not shown) to form brine. Thus, the use of salt caverns as underground cavern 10 has an additional advantage that the preferred immiscible displacing liquid 40, brine, is produced during the formation of the salt cavern.

In the leaching configuration, the well is cemented to 100 feet above the cavern roof 62. The actual depth of the cavern roof 62 depends on the geometry of the selected salt dome 48, but a desirable position would be between 1500 and 3000 feet below ground level 12. The spacing between adjacent caverns would provide a pillar to diameter ratio of 1.78. Cavern walls 37 and cavity 36 are formed by injecting water into the salt dome 48 through the wash pipe (not shown) and producing brine up concentric casing 38 as the salt dissolves into the water. The brine that is produced in the formation of a salt cavern is approximately seven to ten times the volume of the cavern being produced. Thus, there is sufficient brine produced to fill brine pond 46 with seven to ten times the displacement requirements of the cold fluids 50 within the cavity 36 of underground cavern 10.

Figures 2, 6:
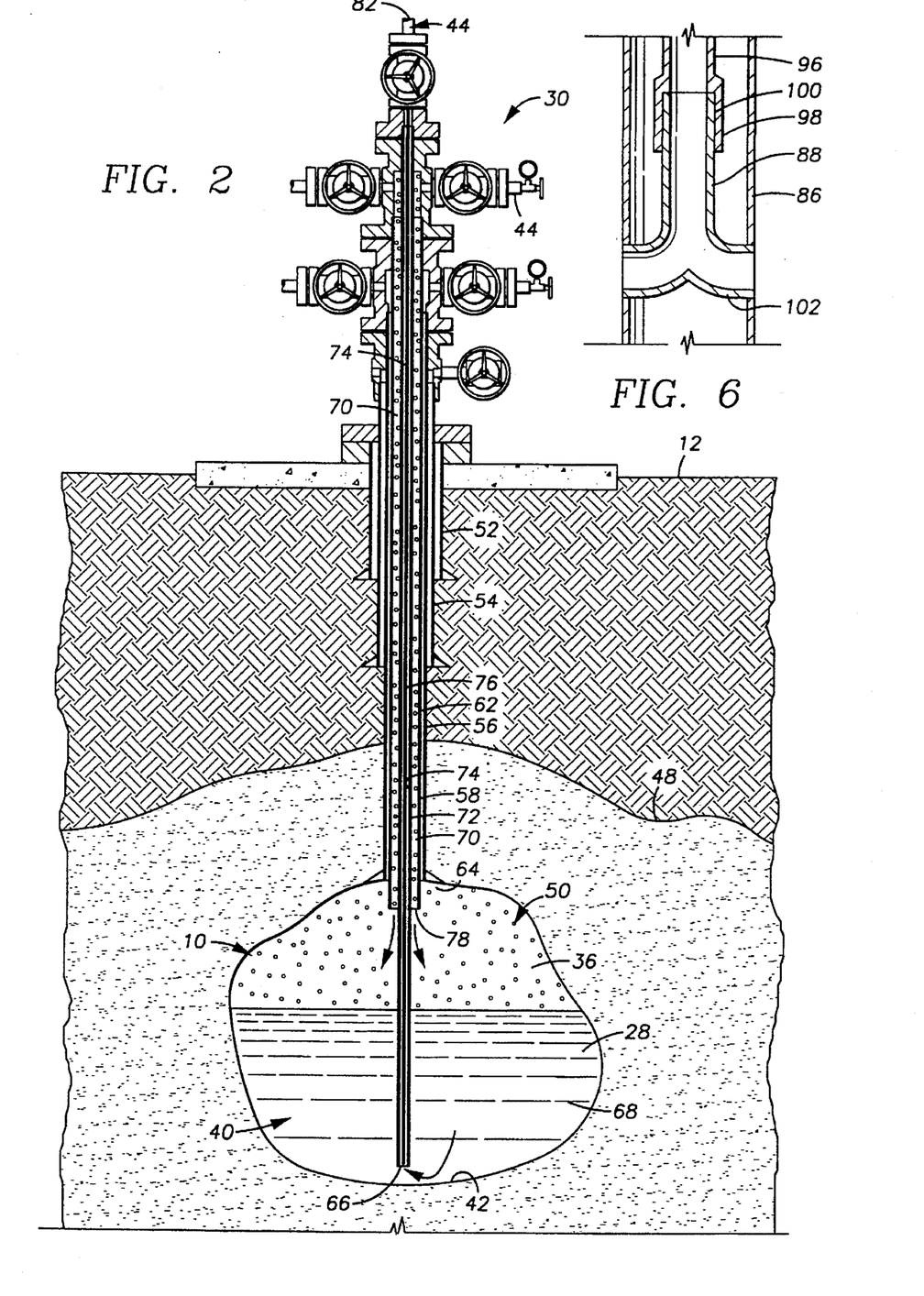
FIG. 2 is a schematic sectional view of the concentric casing and tubing extending into the subterranean cavern of the storage facility.
FIG. 6 is a partial elevation view of FIG. 4 illustrating the crossover sub.

Referring now to FIG. 2, in constructing the subterranean cavern 10 of the present invention, a well is drilled by conventional means using a rig (not shown) for drilling a bore hole from the ground level 12 into the salt dome 48. Core and logs from this well will confirm seismic data and establish the suitability of the salt dome 48 for storage purposes. Initially, a borehole is drilled for the outermost surface casing 52 which is cemented into place. Another borehole is then drilled for intermediate casing 54 which is also cemented into place. Still another borehole is drilled and which extends from the surface of ground 12 to a location within the salt dome 48 and is the last cemented casing string 56. Casing string 56 is the smallest diameter casing cemented within the well and forms a casing seat 64 above the cavern 10. An outer casing string 58 is then run into the last cemented casing string 56 and is suspended by wellhead 30. An inner tubing string 60 is suspended within outer casing string 58. For LNG injection, inner casing string 58 may have a 16 inch outer diameter and inner tubing string 60 may have a 13⅜ inch diameter. Inner tubing string 58 may have a smaller diameter to reduce expense. The last cemented casing string 56 and outer casing string 60 form an outer annulus 62 and outer casing string 58 and inner tubing string 60 form an inner annulus 70. The outer casing string 58 typically is fixed in diameter with the diameter of the center, inner tubing string 60 being variable. As the diameter of inner tubing string 60 is increased, the heat transfer is increased because of the increased area of annular wall 72. Thus, the size of the flow path or annulus 70 for the cold fluids 50 may be varied by varying the diameter of inner tubing string 60. Annulus 70 is preferably sized to handle the flow rate of the cold fluids 50 determined by the off-loading rate of the tanker 14.

The lower terminal end 66 of center tubing string 60 extends to a point as close as possible to the bottom 42 of the cavern 10. The lower terminal end 66 of the tubing string 60 should always be projecting into a pool 68 of brine 40 at the bottom 42 of the cavern 10. When the cavern 10 is fully filled with cold fluids 50, the tubing string 60 is still projecting into a bottom pool 68 of brine 40.

The last cemented casing string 56, outer casing string 58, and center tubing string form hanging string configuration 38 with center tubing string 60 suspended within outer casing string 58 forming annulus 70. The cold fluids such as liquified natural or petroleum gas enter wellhead 30 from pipeline 18 at sub-zero temperatures and are pumped down the annulus 70 forcing and thereby displacing the brine 40 up through the trow bore 74 of center tubing string 60 to wellhead 30 connected to pipeline 44.

As the cold fluids 50 are pumped down the annulus 70, the cold fluids 50 are elevated in temperature (heated) due to the heat exchanged through the annular wall 72 of center tubing string 60 with the brine 40 passing upwardly through the flow bore 74 of the center tubing string 60. Thus, a counterflow heat exchange occurs between the cold fluid 50 and warm brine 40 whereby there is a heat transfer from the brine 40 to the cold fluids 50 and the temperature of the cold fluids is elevated to a temperature which is compatible with the structure of the subterranean cavern 10.

In the case where the cold fluid 50 is a liquified natural gas, the LNG is pumped down the annulus 70 at an initial temperature of about −250° F. at the wellhead. In the case of liquified petroleum gas, the LPG is pumped down the annulus 70 at an initial temperature of about −40° F. at the wellhead. Because of these sub-zero temperatures, the wellhead 30 is manufactured from cryogenically compatible materials such as the cryogenic metals, stainless steel or nickel steel alloy. For example, a stainless steel may be used although other alloys are also available. Wellhead 30 is otherwise of a configuration well known the art. Further, these sub-zero temperatures require that the outer casing string 58 and inner tubing string 60 also be made from cryogenically compatible materials such as the cryogenic metals. A 304 stainless steel or a 9% nickel alloy is preferred. The cryogenically compatible materials have less conductivity than that of common carbon steel. Thus, the use of exotic alloys reduces the heat exchange for a particular length of the tubing string 60. However, it may be desirable to have a more gradual heat transfer through the tubing string wall 72 as the cold fluid 50 passes down the annulus 70 so as to reduce the risk of forming an insulator, such as salt or ice, within inner tubing string 60 as hereinafter described.

The brine 40 disposed in the lower area 28 of cavity 36 of cavern 10 has a typical ambient temperature of around 90° F. or greater. As the brine 40 is displaced by the cold fluids 50 passing down the annulus 70, the brine 40 passes up tubing string 60 to wellhead 30 and flows into pipeline 44 to brine pond or reservoir 46.

Since the formation of the subterranean salt cavern 10 produces approximately seven to ten times the volume of brine 40 than that of the volume of cavity 36 of cavern 10, the excess brine 40 may be stored in a plurality of different brine ponds or reservoirs 46. Multiple brine ponds 46 allow a greater turnover of cold fluid storage in any particular cavern 10. Thus, the frequency of the turnover of gas storage can be increased. There is a limit on the number of times the brine 40 in a particular brine pond 46 may be reused without requiring some reheating of the brine 40. For example, reliance on the present invention strictly as a continuous vaporization technique of liquified gas prior to transport through the pipeline 24 would require that the brine 40 be rotated too often. The brine 40 must be heated back up to near its original temperature before it can be used again for heat exchange. In an ideal situation, the exiting brine 40 from a particular cavern 10 would be returned to the cavern 10 over a winter season so that the temperature of the brine 40 could be brought back up to a suitable elevated temperature by heat exchange with the walls 37 of cavern 10.

It is preferable that brine pond 46 be a solar pond. Thus, the pond may be heated by the sun. The pond 46 may also be either a surface pond or a subsurface pond. Subsea brine ponds may be used since they too may be heated up and act like a solar pond. Natural brine ponds have been found to be heated because of the filtered solar heating through the ice. The brine was found to be many degrees higher in temperature than that of the ambient water. Thus, solar heating the brine pond 46 is applicable to both subsea and surface ponds.

Outer annulus 62 is a protective buffer annulus for the last cemented string 56. Although there is a natural annular gas space around outer casing string 58, the passage of cold fluids down annulus 70 will tend to also reduce the temperature of the last cemented casing string 56 which is preferably not made of a cryogenically compatible material. To protect the last cemented casing string 56, typically made of a common carbon steel, which is cemented in place, a stream of gas is warmed by heater 29 and passed down the outer buffer annulus 62 to maintain the temperature of the last cemented casing string 56 at a temperature which does not adversely affect the cement bond. The warm gas preferably is a slip stream of the cold fluid 50, or it may be a gas of the same composition as that of the cold fluid 50, which has passed through a small heater (not shown) at the surface to produce a stream of warm gas for injection into annulus 62. The warm gas stream is used as a thermal buffer in the outer annulus 62 to protect the last cemented casing string 56 from the sub-zero temperatures of the cold fluid 50 passing down inner annulus 70. It can be appreciated and it is particularly important for the warm gas stream to protect the upper sections of casing string 56 where the temperatures will be the lowest.

Further, as the brine 40 passes up the flow bore 74 of inner tubing string 60, the temperature of the brine drops tending to cause the salt in the brine 40 to crystalize and coat the inner periphery of the annular wall 72 of inner tubing string 60. Should the salt crystalize and coat tubing string 60, the heat transfer through wall 72 is inhibited thereby reducing the heat exchange with the downwardly flowing cold fluids 50 through annulus 70.

In operation, there will be a boundary layer and a temperature profile in the liquid and it is conceivable that the brine could approach the freezing point at the tubing wall 72 which is in contact with the cold fluids 50. The freezing point of brine 40 is lowest where the brine 40 is less than 100% saturation. Thus, as the brine 40 approaches 100% saturation as a result of cooling, the freezing point could reach as high as 32° F. Should the brine begin to freeze and ice the inner periphery of wall 72 of inner tubing string 60, the formation of ice will not only inhibit the heat transfer through wall 72 but also restrict the flow of brine 40 upwardly through the flow bore 74 of inner tubing string 60. One solution is to dilute the brine with hot water to raise its temperature and lower its saturation. Also, other solutions include heat tracing the center tubing in order to keep the boundary layer warm or to preheat the cold fluids 50.

To prevent the salt from crystallizing out of the brine 40, a dilution string 76, preferably of coiled tubing, may be inserted down the flow bore 74 of inner tubing string 60. Dilution string 76 is a tube of small diameter which preferably extends down the length of tubing string 60. Fresh warm water is passed down dilution string 76 and injected at one or more locations into the bore 74 of inner tubing string 60 to dilute the brine 40 and prevent the salt from crystallizing.

Figure 3:
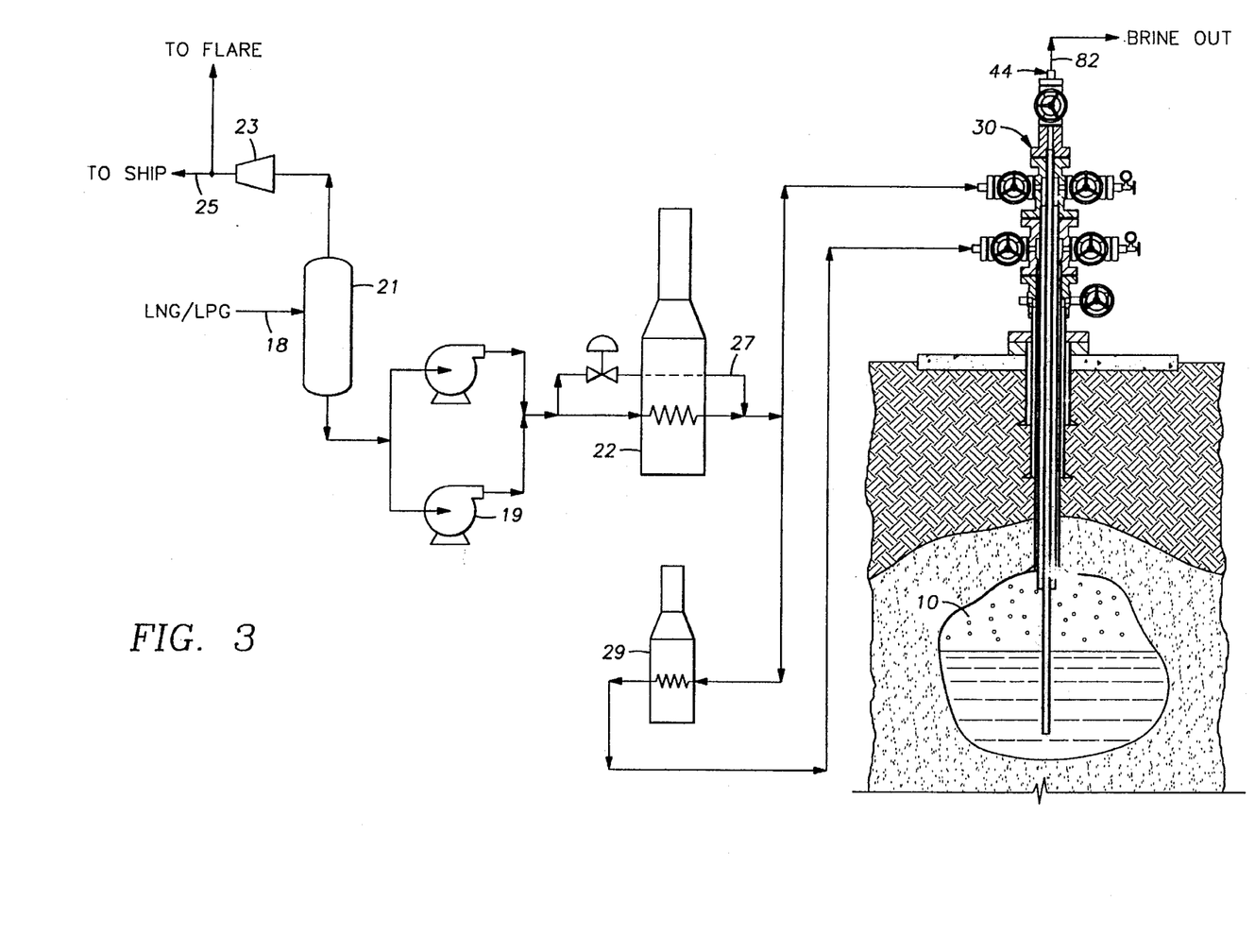
FIG. 3 is a flow diagram illustrating the off-loading of cold fluids and injecting the cold fluids into a salt cavern.

Referring now to FIG. 3, there is shown a flow diagram for the process of the present invention. The cold fluids 50 are piped to shore via pipeline 18 to a flash or separation tank 21 where any vapors, produced during the passage of the stream of low pressure cold fluids through the piping from tanker 14, may be separated from the liquids. The liquid cold fluids 50 then pass through multi-stage high pressure injection pumps 19. It is preferred that only liquids pass through injection pumps 19. Those vapors which are separated from the liquids in separation tank 21 may be compressed by compressor 23 and passed back to tanker 14 via a pipeline 25. The vapors may be pumped into the cryogenic tank 16 from which the cold fluids 50 are being transferred to shore. By pumping the vapors into tank 16, the vapors may be used to pressurize tank 16 and thus help reduce the pumping requirements for the cold fluids 50 passing through pipeline 18. Also, by injecting the vapor stream into tank 16, a vacuum is prevented from being formed within tank 16 so as to not inhibit the removal of the cold fluids 50 through pipeline 18. The vapors allow equalization to take place within tank 16.

The liquid cold fluids 50 are then pumped by the multi-stage high pressure injector pumps 19 to the optional preheater 22. A temperature control by-pass 27 is provided to maintain the temperature of the cold fluids 50 at a predetermined temperature. The cold fluids 50 passing from preheater 22 then enter wellhead 30 and pass down annulus 70 into cavern 10. The brine 40 passing up the bore 74 of inner tubing string 60 pass in heat exchange relationship with the downwardly flowing cold fluids 50 and flow to the brine pond 46 via pipeline 44.

In the case of liquified natural gas, the LNG is typically stored on tanker 14 at a temperature of −270° F. and at an atmospheric pressure of 14.7 psig. The LNG enters the wellhead 30 at an initial temperature of −250° F. (due to pumping and other heat sources). As the LNG flows down the length of annulus 70 and heat is exchanged with the brine 40 through the wall 72 of tubing string 70, the temperature of the LNG is elevated. Depending upon the configuration of casing string 58 and tubing string 60, and the flow rates of the LNG passing down the annulus 70 and the brine 40 passing up tubing string 60, the temperature of the LNG will be elevated such that the LNG will exit the outlet 78 of annulus 70 at a temperature in the range of 20°–40° F. The temperature of the LNG is sufficiently elevated such that the temperature of the LNG can be withstood by the walls 37 of the cavern 10. The brine 40 exiting the outlet 82 of wellhead 30 at the surface will exit at a temperature in the range of 50°–70° F. The preferred brine temperature exiting at the surface is just under 60° F. and the preferred LNG temperature exiting the annulus 70 is around 36° F.

As the LNG is pumped down the annulus 70, heat is absorbed by the LNG from the brine 40, the LNG expands and the pressure of the LNG rises. The LNG exits at a particular exit pressure which then determines its density. This pressure, as well as the temperature of the LNG, defines the density which is translated into a volumetric rate in cubic feet per hour. That rate then determines the rate of the brine 40 going up the center tubing string 60. The volumetric rate of the brine 40 exiting the cavern 10 is the same volumetric rate of the natural gas entering the cavern 10. There is a straight displacement. When the LNG enters a lower pressure space, it expands and forces the brine 40 up the center tubing string 60. Approximately 2½ to 4½ times the volume of the brine 40 flows out of the cavern 10 as that of the LNG entering the wellhead 30. A constant flow rate of the LNG causes the flow of the brine to vary. The brine flow varies due to the differences in the densities between the LNG and brine 40 which are governed by the pressure and temperature of the LNG passing through the annulus 70.

The higher the pressure drop of the LNG as it passes down the annulus 70, the greater the decrease in the density of the LNG. For a given flow rate, when the density decreases, the velocity of the LNG increases. When the velocity increases, the rate of heat transfer increases to some limiting value. Beyond this, increases in flow velocity will not be beneficial.

The LNG typically enters the wellhead 30 at a pressure in the range of 1600–2100 psi. The LNG passing down annulus 70 has the additional pressure of the hydrostatic head less pressure drop as it passes down annulus 70 and into the cavity 36 of cavern 10. The LNG, in one case, exits at outlet 78 of annulus 70 at a pressure of approximately 1800 psi. The pressure within the subterranean cavern 10 is restricted to the maximum pressure that can be withstood by the casing seat 62 of the last cemented casing string 56. No gas cushion is required in cavern 10. However, the LNG can exit outlet 78 at any pressure commonly encountered in salt dome caverns which are used for conventional natural gas storage.

It is preferred that the pressure drop of the brine 40 be as small as possible to allow the LNG to expand and force brine 40 out of the cavern 10. This provides for maximum heat transfer. Plus, the limiting factor in the tubing string 60 is the LNG side of wall 72 so that there can be a slower brine flow without reducing the overall flow velocity but not necessarily the volume because the inner tubing string 60 has a greater cross-sectional flow area.

The LNG 50 exiting annulus 70 has a sufficiently high temperature and remains under a sufficiently high pressure that the LNG, such as methane, stays in a super critical state, i.e. a dense phase. In the dense phase, the LNG 50 is by definition neither a liquid or a gas. The term dense phase is a particular state of the cold fluids at which the cold fluids are neither a gas nor a liquid but appear to act like liquids and gases. The cold fluid 50 is at a pressure and temperature which are greater than the critical pressure and/or critical temperature for the particular cold fluid 50. The critical pressure is defined as the pressure at which the liquid density and vapor density of a substance are the same. The critical temperature is defined as the temperature at which the liquid density and vapor density of a substance are the same. See *GPSA Data Book*, page 24-1, Volume II, (10th Ed. 1987). The LNG technically does not become gaseous until the pressure is lowered substantially below the ambient pressure in cavern 10 such as upon removal from the cavern 10 and passage into the pipeline 24. At that time, there is sufficient pressure reduction to allow the LNG to move from the dense phase to the gaseous phase.

The brine 40 has a greater heat capacity due to its greater specific heat than that of LNG 50. Thus, a small temperature change in the brine 40 translates into a proportionally greater amount of temperature change in the LNG 50.

As the LNG expands in cavity 36 of cavern 10, the mass of the LNG 50 displaces approximately 2½ to 4½ times the mass of the brine 40 due to the increase in gas volume. Thus, there is a double benefit of the substantially greater specific heat of the brine 40 plus the significant increase in the volume of the gas 50.

The cavern walls 37 have a temperature similar to that of the brine 40, approximately 90° F. The temperature will vary with the depth of the cavern 10. After prolonged storage, the LNG stored in the cavern will come into equilibrium with the temperature of the cavern walls 37. The salt in the walls 37 of the salt cavern 10 has an even higher specific heat per cubic foot than that of the brine 40. Only a very shallow penetration of this temperature would be achieved into the salt. There would be a natural heat exchange between the salt and the brine 40 in the cavern 10. This would occur by natural convection.

With the present invention, the tanker 14 would off-load the liquified natural gas into a subterranean salt cavern located either off-shore or on-shore near the shore line. The LNG would be pumped directly into the salt cavern 10 by passing through the counterflow heat exchanger and flowing into the cavern 10 at an acceptable temperature. The cooled brine 40 would then flow and be stored in a brine pond 46. The brine pond 46 could either be a surface brine pond or a subsurface brine pond. See U.S. patent application Ser. No. 5,129,759 incorporated herein by reference. The heated LNG would then be ready for delivery to the pipeline 24.

No cooling requirements are necessary for storing the LNG in the subterranean cavern 10 and no vaporization requirements are necessary for preparing the LNG for transportation through pipeline 24. Thus, there is substantial economic benefit in using the present invention. Not only is the vaporization cost eliminated, but the cost of developing a subterranean salt cavern 10 for the storage of the LNG is relatively inexpensive as compared to the capital cost of building cryogenic tanks for storing LNG on shore.

If for some reason a higher injection temperature were preferred and during initial startup, the LNG is preheated by heater 22 prior to passage into the subterranean cavern 10. Preheaters might be used when the LNG stored in the cavern 10 would be turned over more frequently than the heating of the brine 40 in the brine pond 46 will allow. Preheater 22 would elevate the temperature of the LNG to allow more frequent turnover of the LNG in the cavern 10. The use of a preheater 22 is still much cheaper than that required by the prior art vaporization process.

In using the present invention for the storage of liquified petroleum gas, the LPG enters the wellhead 30 at an initial temperature of about −40° F. As the LPG flows down the length of annulus 70 and heat is exchanged with brine 40 through wall 72 of string 70, the temperature of the LPG is elevated and typically will exit the outlet 78 of annulus 70 at a temperature in the range of about 35° to 40° F. The LPG remains in the liquid state throughout its passage through annulus 70. The brine 40 exiting outlet 82 of wellhead 30 will exit at a temperature of approximately 50° to 60° F.

The LPG, unlike the LNG, remains in a liquid state upon entering the cavern 10, i.e. it expands little since no phase change occurs. Thus, for approximately every barrel of LPG pumped down annulus 70, one barrel of brine 40 exits wellhead 30. If an equal volume of LPG at −40° F. and brine 40 at 80° F. are allowed to come into thermal equilibrium, a temperature of approximately 55° F. would result. Less brine is displaced per unit volume of LPG than per unit volume of LNG. The pressure of the LPG increases due to the heat absorbed by the brine 40 and the salt in walls 37. The LPG is maintained at a pressure in the range of 700–1200 psi within cavity 36 of cavern 10.

There are two principal methods of removing the cold fluids 50 from cavern 10. The cold fluids 50 may be removed by pumping brine 40 down tubing string 60 and into the cavern 10 thereby displacing the cold fluids back up the annulus 70 to the surface. There is a pressure drop of the cold fluids 50 at the wellhead 30. This method of removal is preferred since the pressure within cavity 36 of cavern 10 may be maintained as the brine 40 is pumped into the cavern 10 to remove the cold fluids 50 through the annulus 70 thereby minimizing the pressure drop in the case of LNG. By pumping brine 40 to remove the cold fluids 50, the cavern 10 pressure and thus the cold fluids 50 pressure can be maintained right up until the cavity 36 of cavern 10 is completely empty of cold fluids 50.

Another method of removing the cold fluids 50 is to merely allow the cold fluids 50 to flow up the annulus 70 from the cavern 10 due to the pressure differential between the pressure within cavern 10 and the pressure at the wellhead 30. However, if the cold fluids 50 were allowed to merely expand so as to pass upwardly through the annulus 70 and be removed from cavern 10, the pressure within cavern 10 would eventually be reduced to a level below which no more cold fluids 50 could be withdrawn due to the minimum pressure requirement limitation which prevents excessive movement or closure of the salt structure of cavern 10. The cold fluids 50 remaining in the cavern 10 would become a cushion, maintaining cavern integrity, and be a fixed expense of the storage facility 20.

Where there is insufficient pressure differential, there will be insufficient pressure to pass the cold fluids 50 through dehydration. Heater 26 may be provided at the surface to prevent hydrate formation that may occur when the cold fluids 50, now a gas, takes a pressure drop in the presence of water vapor. The presence of water vapor causes hydrate formation. This is prevented by keeping the cold fluids 50 at an elevated temperature since hydrates clog up the annulus 70 or surface equipment. Any requirement for a heater 26 would be small and would not be the heavy duty heater used in the prior art.

The temperature of the cold fluids 50 exiting wellhead 30 is a function of the amount of time that the cold fluids 50 has been stored in cavern 10. If the cold fluids 50 are removed immediately, their temperature would be their exit temperature from annulus 70 upon their initial storage plus any increase due to heat exchange with the newly injected brine. If, however, the cold fluids 50 remain in the cavern 10 for a substantial amount of time, the cold fluids 50 would have the same temperature as that of the environment within cavern 10, i.e., approximately 90° F.

In the case of LNG it is often preferred to meter the LNG for transportation into the pipeline 24 at a temperature of approximately 60° F. and at a pressure of approximately 600 psi. At this temperature and pressure, the LNG would pass into the pipeline 24 in a vapor form.

Figures 4, 5:
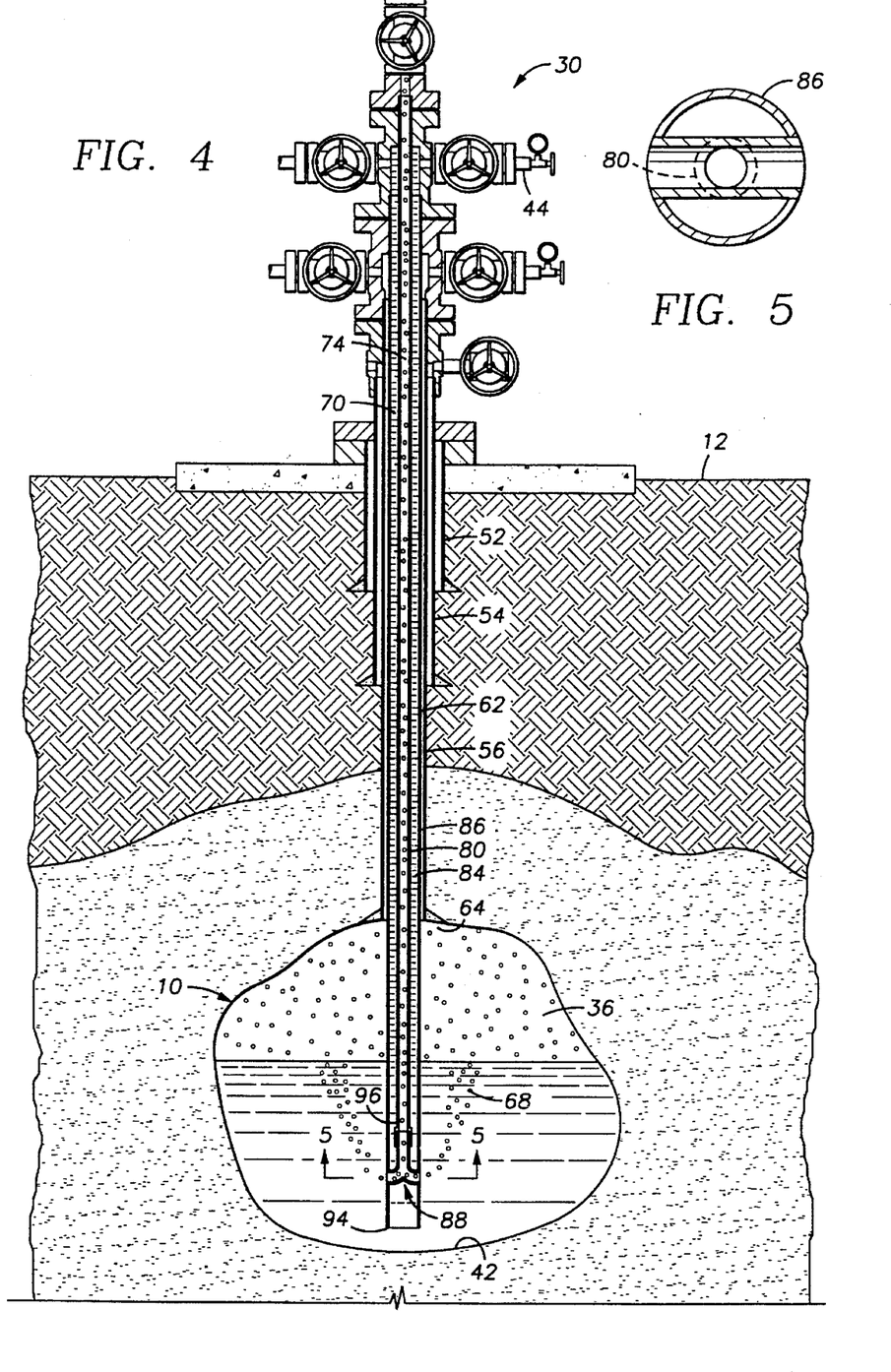
FIG. 4 is a schematic sectional view of an alternative embodiment of the facility shown in FIG. 2.
FIG. 5 is a cross-sectional view at plane 5—5 shown in FIG. 4.

Referring now to FIG. 4, there is shown an alternative hanging string configuration for passing the cold fluids 50 down the center tubing string rather than down through the annulus. Thus, in this embodiment, the flow of the cold fluids 50 and brine 40 are reversed in that the cold fluids 50 pass down the center tubing string 80 and the brine passes up the annulus 84 formed between tubing string 80 and outer casing string 86. The outer casing string 86 and tubing string 80 extend to a point adjacent the bottom 42 of cavern 10 where the lower terminal ends of strings 80, 84 are always suspended within the brine pool 68 at the bottom of cavern 10 even when cavern 10 is totally filled with cold fluid 50. The displacement is the same in both the embodiments of FIGS. 2 and 4. The principal difference is the reversal of flow path.

Since the cold fluids 50 pass down the center tubing string 80, the sub-zero temperatures of the cold fluids 50 require that center tubing string 80 be made of a cryogenically compatible material such as a cryogenic metal like stainless steel or nickel steel alloy. This alternative embodiment has the advantage that only the inner tubing string 80 must be made of a cryogenic material and not both tubing string 80 and outer casing string 86. In the preferred embodiment, both inner tubing string 60 and outer casing string 58 are subjected to the sub-zero temperatures of cold fluids 50 and thus must be made of a cryogenic metal.

If only the end of the center tubing string 80 were injected into the brine 40, it would be possible for the cold fluids 50 to pass out of the flow bore of the center tubing string 80 and right back up the annulus 82 with the brine 40. This is prevented by the use of a crossover sub 88.

The crossover sub 88 is disposed in outer casing string 86 adjacent the terminal end of string 86. Crossover sub 86 has a T-shaped cross section forming a central conduit 100 and two transverse conduits 102. The terminal end 96 of inner tubing string 80 includes a polished bore receiver 98 stabbed over the central conduit 100 of crossover sub 86. The transverse conduits 102 provide apertures through casing 86 to allow the cold fluids 50 to pass through the apertures and out the sides of casing 86. Crossover sub 88 causes the cold fluids 50 to exit into cavity 36 above the outlet of casing string 86.

The crossover sub 88 may be located anywhere between the casing seat 62 located at the top of the cavern 10 and above the terminal end 94 of outer casing string 86. It may be desirable for locating the crossover sub 88 adjacent the top of the cavern 90 to reduce the length and thus the expense of inner tubing string 80. On the other hand, where greater heat transfer is desired, the crossover sub 88 may be located adjacent the terminal end 94 of outer casing string 86 to provide a long tubing string 80 and thus long heat transfer surface to maximize the heat transfer between the cold fluids 50 and brine 40 as the cold fluids 50 pass down the longer length of inner tubing string 80. Generally, it is preferred to have the crossover sub 88 disposed as low as possible in the outer tubing string 86 to maximize the length of the inner tubing string 80 subjected to heat exchange between the brine 40 and cold fluids 50. Thus, it is preferred that the crossover sub 88 be mounted adjacent the bottom of the outer casing string 86.

An advantage of this alternative embodiment is the ability to avoid the use of exotic alloys in the outer casing string 86 which would not have to be made of the more expensive stainless or nickel steel. Special wellhead equipment would be required to run a dilution string down the annulus 84.

Although the preferred embodiment has been described as using a salt cavern as the storage facility, it can be appreciated by one skilled in the art that the present invention may also be used in conventional caverns as well as solution mined caverns. The cavern of the present invention may include conventional caverns or mechanical mines made in hard rock. In such conventional caverns, either fresh water or brine could be used as the immiscible displacing liquid.

It should also be appreciated that the present invention may be used with any cold fluids including liquid natural gas, liquid petroleum gas, hydrogen, and helium. The present invention is particularly advantageous for storage of any fluids which must be shipped long distances in sub-zero degree Fahrenheit containers such as cryogenic tanks.

Although the heat exchange between the cold fluids and brine has been shown as occurring within the concentric casing suspended from the surface into the subterranean cavern, it should be appreciated that the cold fluids may be warmed using a heat exchanger at the surface whereby the brine passes in heat exchange with the cold fluids through a surface heat exchanger. In particular, a surface heat exchanger might be used where the cold fluids being off-loaded from a tanker are to be heated for transportation through a pipeline. In such a case, the cold fluids may be passed through a surface heat exchanger above ground with the warm brine from a subterranean cavern passing in heat exchange relationship with the cold fluids to heat the cold fluids to an appropriate temperature prior to passage into the pipeline. It should further be appreciated that the brine passing through the surface heat exchanger could be pumped from the brine pond rather than the subterranean cavern.

While a preferred embodiment of the invention has been shown and described, modifications can be made by one skilled in the art without departing from the spirit of the invention.

We claim:

1. A subterranean storage facility for storing cold fluids comprising:

a subterranean cavern having walls forming a cavity;

a member for passing the cold fluids in heat exchange relationship with another fluid;

the cold fluids having a first temperature at which the cold fluids are not compatible with said walls of said cavity and a second temperature at which the cold fluids are compatible with said walls of said cavity;

said member receiving the cold fluids outside said cavity at said first temperature and passing the cold fluids in heat exchange relationship with said another fluid to raise the temperature of the cold fluids to said second temperature before disposing the cold fluids in said cavity;

means for removing the cold fluids from said cavity;

the temperature of the cold fluids being raised from said first temperature to said second temperature as the cold fluids are disposed in said cavity.

2. The subterranean storage facility of claim 1 wherein said member and removal means includes a hanging pipe string extending into said cavity and having a length to provide a heat exchange relationship which will raise the temperature to said second temperature.

3. The subterranean storage facility of claim 1 wherein said another fluid includes an immiscible displacing liquid disposed in said cavity through another member adjacent said member wherein heat is exchanged between said immiscible displacing liquid and the cold fluids.

4. The subterranean storage facility of claim 3 wherein said members form a counterflow heat exchanger.

5. The subterranean storage facility of claim 1 further including a plurality of subterranean caverns for the storage of cold fluids in a dense phase.

6. A storage facility for liquified gas, comprising:

an underground salt cavern having walls forming an underground cavity;

an immiscible displacing liquid adapted to be disposed in said cavity;

a first pipe extending from above ground to said cavity;

a second pipe suspended within said first pipe and extending to a position within said immiscible displacing liquid;

said first and second pipes forming first and second flow bores;

the liquified gas having a first temperature at which the liquified gas will freeze the immiscible displacing liquid and a second temperature at which the liquified gas will not freeze the immiscible displacing liquid disposed in said cavity;

a portion of said immiscible displacing liquid passing in heat exchange relationship with the liquified gas as the liquified gas flows down said first flow bore and said immiscible displacing liquid flows up said second flow bore to raise the temperature of the liquified gas from said first temperature to said second temperature.

7. The storage facility of claim 6 wherein said immiscible displacing fluid increases the temperature of the liquified gas within said cavity whereby the liquified gas is in a dense phase.

8. A method for storing cold fluids in a subterranean cavern comprising the steps of:

disposing an immiscible displacing liquid in the cavity of the cavern;

extending inner and outer pipe strings forming a first flow bore from above ground into the cavity;

injecting the cold fluids into the first flow bore at a first temperature at which the cold fluids are not compatible with the walls of the cavity;

passing the cold fluids through the first flow bore into the cavity;

displacing the immiscible displacing liquid to above ground through a second flow bore formed by the inner and outer pipe strings;

exchanging heat between the immiscible displacing liquid and the cold fluids through the wall of the inner pipe string in heat exchange relationship; and exiting the cold fluids from the first flow bore at a second temperature at which the cold fluids are compatible with the walls of the cavity;

storing the cold fluids in the cavity at a temperature and pressure whereby the cold fluids are in a dense phase.

9. A method for the direct injection of liquified natural gas into a subterranean cavern comprising the steps of:

receiving the liquified natural gas at a first temperature and pressure whereby the liquified natural gas is in a liquid phase and the liquified natural gas is not compatible with the walls of the cavern;

injecting the liquified natural gas through a wellhead suspending concentric pipe strings into the cavity of a subterranean cavern;

providing the cavity of the cavern with an immiscible displacing liquid;

pumping the liquified natural gas down an annulus formed by the concentric pipe strings;

displacing the immiscible displacing liquid in the cavity up through the flow bore of the inner pipe of the concentric pipe string;

heating the liquified natural gas by heat exchange through the wall of the inner pipe string as the liquified natural gas passes down the annulus and the immiscible displacing fluid is displaced up the flow bore of the inner pipe string;

exiting the liquified natural gas from the annulus at a second temperature at which the liquified natural gas is compatible with the walls of the cavern;

storing the liquified natural gas in the cavity at a temperature and pressure whereby the liquified natural gas is in the dense phase; and allowing the liquified natural gas in the dense phase to reach the ambient temperature of the subterranean cavern.

10. The method of claim 9 further including the step of passing the immiscible displacing liquid through the wellhead and into a solar pond.

11. The method of claim 9 further including the steps of pumping the immiscible displacing liquid down the inner pipe string and into the cavity of the cavern;

displacing the liquified natural gas in the dense phase up through the annulus formed by the concentric pipe strings at a flow rate whereby the cavern pressure is maintained constant;

heating and depressurizing the liquified natural gas in the dense phase whereby the liquified natural gas tends to vaporize; and passing the liquified natural gas in vapor form into a pipeline.

12. The method of claim 11 further including the step of heating the liquified natural gas in the dense phase exiting the wellhead using a heater prior to injection into the pipeline.

13. The method of claim 9 further including the step of heating the liquified natural gas with a preheater to a predetermined temperature prior to injecting the liquified natural gas into the wellhead.

14. The method of claim 9 wherein the liquified natural gas passes into the wellhead at a temperature of $-250°$ F. or colder.

15. The method of claim 9 further including the step of selecting the length of the tubing string forming the annulus whereby the liquified natural gas passing from the terminal end of the annulus enters the cavity of the cavern at a temperature in the range of $20-40°$ F.

16. The method of claim 9 further comprising the step of expanding the liquified natural gas as it enters the cavity of the cavern and displacing over twice its volume in immiscible displacing fluid from the cavity of the cavern.

17. The method of claim 9 further comprising the step of exiting the liquified natural gas into the cavern at a pressure commonly encountered in salt dome caverns which are used for conventional natural gas storage.

18. The method of claim 17 further including the step of storing the liquified natural gas at a super critical state within the cavity of the cavern.

19. A method for the direct injection of liquified natural gas into a subterranean cavern comprising the steps of:

receiving the liquified natural gas at a temperature and pressure whereby the liquified natural gas is in a liquid phase;

injecting the liquified natural gas through a wellhead suspending concentric pipe strings into the cavity of a subterranean cavern;

providing the cavity of the cavern with an immiscible displacing liquid;

pumping the liquified natural gas down an annulus formed by the concentric pipe strings and into a cavity;

displacing the immiscible displacing liquid in the cavity up through the flow bore of the inner pipe of the concentric pipe string;

heating the liquified natural gas by heat exchange through the wall of the inner pipe string as the liquified natural gas passes down the annulus and the immiscible displacing fluid is displaced up the flow bore of the inner pipe string:

storing the liquified natural gas in the cavity at a temperature and pressure whereby the liquified natural gas in the dense phase;

allowing the liquified natural gas in the dense phase to reach the ambient temperature of the subterranean cavern;

passing a warm gas of the same composition as the liquified natural gas down an outer buffer annulus to prevent the overcooling of any outer casing strings.

20. A method for the direct injection of liquified natural gas into a subterranean cavern comprising the steps of:

receiving the liquified natural gas at a temperature and pressure whereby the liquified natural gas is in a liquid phase;

injecting the liquified natural gas through a wellhead suspending concentric pipe strings into the cavity of a subterranean cavern;

providing the cavity of the cavern with an immiscible displacing liquid;

pumping the liquified natural gas down an annulus formed by the concentric pipe strings and into a cavity;

displacing the immiscible displacing liquid in the cavity up through the flow bore of the inner pipe of the concentric pipe string;

heating the liquified natural gas by heat exchange through the wall of the inner pipe string as the liquified natural gas passes down the annulus and the immiscible displacing fluid is displaced up the flow bore of the inner pipe string;

storing the liquified natural gas in the cavity at a temperature and pressure whereby the liquified natural gas in the dense phase;

allowing the liquified natural gas in the dense phase to reach the ambient temperature of the subterranean cavern;

injecting water that is warmer than the immiscible displacing liquid into the inner pipe string to dilute the immiscible displacing liquid and prevent the formation of salt or ice on the inner walls of the inner pipe string.

21. A method for the direct injection of liquified natural gas into a subterranean cavern comprising the steps of:

receiving the liquified natural gas at a temperature and pressure whereby the liquified natural gas is in a liquid phase;

injecting the liquified natural gas through a wellhead suspending concentric pipe strings into the cavity of a subterranean cavern;

providing the cavity of the cavern with an immiscible displacing liquid;

pumping the liquified natural gas down an annulus formed by the concentric pipe strings and into a cavity:

displacing the immiscible displacing liquid in the cavity up through the flow bore of the inner pipe of the concentric pipe string;

heating the liquified natural gas by heat exchange through the wall of the inner pipe string as the liquified natural gas passes down the annulus and the immiscible displacing fluid is displaced up the flow bore of the inner pipe string.

22. A method for storing liquified petroleum gas in a subterranean cavern comprising the steps of:

disposing an immiscible displacing liquid in the cavity of the cavern;

extending inner and outer pipe strings forming a first flow bore from above ground into the cavity;

injecting into the first flow bore the liquified petroleum gas at a first temperature at which the liquified petroleum gas is not compatible with the walls of the cavity;

passing the liquified petroleum gas through the first flow bore into the cavity;

displacing the immiscible displacing liquid to above ground through a second flow bore formed by the inner and outer pipe strings;

exchanging heat between the immiscible displacing liquid and the liquified petroleum gas through the wall of the inner pipe spring in heat exchange relationship; and raising the temperature of the liquidfied petroleum gas to a second temperature at which the liquified petroleum gas is compatible with the walls of the cavity;

exiting the liquified petroleum gas at said second temperature from the first flow bore;

storing liquified petroleum gas in the cavity at a temperature and pressure whereby the liquified petroleum gas remains in the liquid phase.

23. The method of claim 22 wherein the liquified petroleum gas is injected into the first flow bore at a first temperature of $-40°$ F.

24. The method of claim 23 wherein the liquified petroleum gas passes out of the first flow bore at a second temperature in the range of $35°$ to $50°$ F.

25. A method for heating liquified gas comprising the steps of:

receiving the liquified gas from a tank;

passing the liquified gas through a heat exchanger in heat exchange relationship with brine drawn from a solar pond at a temperature whereby the liquified gas is heated to pipeline temperature; and passing the heated liquified gas into a pipeline.

* * * * *